Patented Dec. 31, 1940

2,227,200

UNITED STATES PATENT OFFICE 2,227,200

ABRASIVE PRODUCT

Norman P. Robie, Niagara Falls, N. Y., assignor to The Carborundum Company, Niagara Falls, N. Y., a corporation of Delaware No Drawing. Application October 30, 1939, Serial No. 301,981

14 Claims. (Cl. 51—298)

This invention relates to abrasive products such as abrasive paper and cloth, polishing set-up wheels and grinding wheels, and to methods of manufacturing the same. More specifically, the invention is concerned with abrasive articles wherein there is employed as a binder, either in whole or in part, a composition which includes a polymer of compounds containing the ethenoid linkage and also containing sufficient carboxyl groups to make the polymer soluble in mild alkalies. The invention is particularly well-adapted to the production of coated abrasive products such as abrasive paper and cloth and set-up wheels.

This application is a continuation-in-part of my copending applications, Serial No. 192,390, filed February 24, 1938; Serial No. 92,937, filed July 27, 1936; and Serial No. 100,920, filed September 15, 1936.

An object of the invention is the provision of improved abrasive articles including an improved binder. Another object of the invention is to provide a coated abrasive article containing a binder which includes as an essential ingredient a synthetic gum which can be taken up in an aqueous alkali solution and consequently can be substituted for glue in the ordinary sandpaper machinery. Another object of the invention is the provision of improved binders for coated abrasives. Other objects will appear from a consideration of the description of the invention as hereinafter set forth.

I have found that coated abrasive articles having excellent properties for many purposes can be made by the use of a class of resins consisting of the products obtained by polymerizing vinyl or acrylic compounds, both of which contain the ethenoid linkage, and which also contain enough acid groups to make the compounds soluble in mild alkalies. The acrylic compounds may be the acrylic acids including the alkyl substitution products such as methacrylic acid. Vinyl compounds may be the partial vinyl esters of polybasic acids in which some of the carboxyl groups of the acids are unreacted and appear in the polymers as the acid groups. The third class is heteropolymers of vinyl or acrylic compounds with polybasic olefinic acids which are acids containing double bonds and which are capable of being polymerized into the same polymeric molecule with vinyl or acrylic compounds. Specifically, examples of the three classes are, respectively, polymethacrylic acid, partial polyvinyl esters of lactic acid, and heteropolymers of styrene with maleic anhydride.

It will thus be seen that there are three classes of materials which meet the general conditions necessary to provide my improved article. In one case, the polymer consists of a plurality of monomers of an acrylic acid. In the second case, esters are formed by reacting only a part of the carboxyl groups appearing in the monomer with polyvinyl alcohol. The third class includes heteropolymers in which the double bond of an ethenoid linkage is opened up to join a vinyl or acrylic compound and provide a polymer containing carboxyl groups in the chain.

Specific compounds of the first class, the polymers of which have been found to be suitable in carrying out my invention, include acrylic acid and alpha-methacrylic acid. As is known, compounds of this class can be polymerized by subjecting the monomeric compounds to suitable treatment such as by exposure to ultra violet light or heating or by the employment of a suitable catalyst such as oxidizing agents like hydrogen peroxide.

The second group of compounds suitable for my purposes comprises certain polyvinyl esters of polybasic acids in which only part of the acids are esterified, thus leaving uncombined acid groups. In describing and claiming such esters, I have chosen to refer to such compounds, in which only part of the acid groups in the polybasic acid are esterified, as "partial polyvinyl esters." For example, a polyvinyl ester of a monobasic acid, such as polyvinyl acetate, may be subjected to the action of a polybasic acid so as to replace some or all of the acetic acid groups with polybasic acid groups. Sufficient polybasic acid is used to give the final gum enough free or uncombined carboxylic groups to make it soluble in mild alkalies. Suitable polybasic acids for this purpose are citric, tartaric, maleic, oxalic, succinic, malic and phthalic acids.

In place of a polycarboxylic acid, I may use a polybasic acid in which one or more of the acid groups are the sulphonic acid ($SO_3H$) group. The products obtained will have widely varying properties depending upon many factors such as the molecular weight of the original polyvinyl acetate, the proportion and type of polybasic acid used, and the time, temperature, solvents and catalysts used in the reaction. The products will therefore vary as regards ease of solution or dispersion in water and other aqueous liquids. Products soluble in alkalies or, in some instances, in water, are produced by reacting polyvinyl acetate with sufficient citric, tartaric or oxalic acid.

Esterification catalysts and solvents can be used in the reaction.

I may also employ copolymers and heteropolymers of these partial polyvinyl esters of polybasic acids. These may be produced by partial reaction, partial hydrolysis or by using copolymers and heteropolymers or their components as the raw materials for the production of copolymers and heteropolymers of partial polyvinyl esters of polybasic acids.

Another method of preparing these alkali soluble partial esters is to esterify polyvinyl alcohol with polybasic acids, their anhydrides or their chlorides. It is thus evident that several methods of attaching acid groups to the polyvinyl compound may be used.

The third group comprises resins formed by the heteropolymerization of a compound containing a vinyl group with an olefine dicarboxylic acid or a compound capable of forming such an acid. Specific materials containing the vinyl group are styrene or vinyl benzene, and vinyl and acrylic acid esters such as vinyl acetate and vinyl chloride. Alternatively, the heteropolymers may be hydrolyzed to form heteropolymers of vinyl alcohol with the acids, or the heteropolymer may be preliminarily hydrolyzed and reacted with an aldehyde to form an acetal. Suitable olefine acids and derivatives include maleic, fumaric, itaconic and citraconic acids and the anhydrides, chlorides, nitriles and other derivatives capable of conversion to the corresponding acids.

The formation of the polymers may be induced by any of the conventional methods employed in polymerization as by heating, exposure to ultra violet light and the addition of suitable catalysts.

I will now illustrate the production of the adhesives employed in carrying out my invention with reference to a few specific examples, it being understood that the examples herein given are illustrative only and not limitative.

*Class I.*—Methacrylic acid which is obtainable commercially stabilized by hydroquinone, was vacuum-distilled to free the acid of the inhibitor. 0.5% benzoyl peroxide was added to catalyze polymerization which was brought about by heating to 110–120° C. until the liquid solidified. Polymerization under these conditions gave a polymer of comparatively low degree of polymerization which was soluble in water. If lower temperatures are employed, longer chains which are less readily soluble in water are obtained.

*Class II.*—5 parts of polyvinyl acetate, obtained by polymerizing vinyl acetate, were boiled under a reflux condenser with 35 parts of lactic acid of 80% strength for 15 hours. At the end of 1½ hours, the polyvinyl acetate had completely dissolved in the lactic acid solution. At the end of this time, the excess lactic acid was separated from the synthetic gum by dialysing through a rubber latex membrane for about 24 hours. The gum was obtained as an aqeuous solution.

*Class III.*—60 parts of maleic anhydride are suspended in 50 parts of styrene and heated slowly on a water bath. At a temperature of about 90° F. soft lumps of resinous material appear in the mass and the suspended maleic anhydride blends into the thin suspending liquid. As the temperature is slowly increased the lumps or curds of resinous material coalesce to a soft gel suspended in the thin liquid and upon heating to around 140° F. followed by alternate cooling and mild heating, the liquid thickens and the gel blends therewith, forming a homogeneous stiff paste. Upon continuing heating, a rigorous exothermic reaction occurs and there is produced a very pale yellow resin which is soluble in dilute aqueous ammonia. An adhesive for use in the manufacture of abrasives is prepared by dissolving the resin in an aqueous ammonia solution.

Part of the styrene may be replaced by vinyl acetate and other acids, such as fumaric acid, may be used instead of the maleic anhydride.

These water or alkali-soluble synthetic gums may be advantageously mixed with other common adhesives such as liquid phenol-formaldehyde resin, starch and glue to modify and improve their properties as abrasive binders. The resulting adhesive film may or may not be water soluble depending on whether or not insolubilizing agents were added to the gum.

In carrying out the invention a backing material is first coated with the binder which has been liquefied, abrasive grains are then distributed over the adhesive coated surface of the backing, and the binder is subsequently hardened by suitable methods. In practice, it is also customary to apply a second coating of adhesive, commonly spoken of in the abrasive art as a "sand-size" or "sizing-coat," over the abrasive coated article to augment the first or "making" coat of adhesive. Additional treatment is then applied to set up the sizing coat and completely harden the binder.

The binders and the abrasive grain may be applied by any of the methods commonly used in making sandpaper. For example, where the abrasive article is made as a web, the web may be fed between a pair of rotating rolls, one of which is partially immersed in a vat of the liquid adhesive, thus coating one side of the moving web with adhesive. The adhesive coated web may then be passed under a grain-feed mechanism which distributes a layer of the abrasive grains onto the web, and the thus coated web may be hung in festoons in a dry-house where it is treated to harden the binder. A sizing coat of adhesive may then be applied by the use of a pair of rolls similar to that used to apply the first or making coat, although I have sometimes found it desirable to spray on the sizing coat. The abrasive grain may be supplied in excess, the excess being removed before sizing, in which case the product is described as having a "full" coat. Alternatively, a restricted quantity of grain may be fed onto the adhesive coated web to give an "open" coat or a coat which does not completely cover the web.

The binder may also be applied by other methods such as by brushing or spraying. These methods are especially useful where single articles, such as preformed discs, or inflexible backings, or backings which for various reasons are not obtainable as a web, are being coated.

The resinous products of my invention are obtainable in various degrees of polymerization and a considerable variation in the properties of the resins is obtainable by the use of different monomers and by changes in the conditions of reaction and the kind and amount of catalyst employed. Because of the great variety of materials which are abraded or polished by the use of coated abrasives, this ability to obtain binders of different degrees of flexibility, strength, softening temperature, and resistance to solvents and the like is of considerable importance. Some of the resins, such as the polymers of acrylic and methacrylic acid, are water-soluble, while others are soluble in dilute aqueous solutions of alkalies such as ammonia, caustic soda or water-soluble amines. Hence, my adhesives lend themselves readily to use in abrasive-coating apparatus such as is commonly employed in making ordinary glue-bonded sandpaper.

In carrying out the invention I may use these synthetic gums as the entire binder or, as I have indicated, certain ones are well suited for blending with other plastic materials such as cellulose derivatives and synthetic resins. For example, some of the gums are rather more flexible than is required for a binder and such products are useful for blending with more brittle and inflexible binders such as heat-hardenable phenolic resins and cellulose esters or with other polyacrylic resins which are too brittle and inflexible when used alone. They may also be advantageously used to modify and improve other water-soluble binders such as glue, methyl cellulose, polyvinyl ethers, polyvinyl alcohol, certain polymerized acrylic compounds, starches and their modifications, sodium silicate, phenol-aldehyde and urea-aldehyde resins which are water miscible in their initial state, or colloidally dispersed binders such as aqueous dispersions of rubber including rubber latex.

Glue is commonly used in manufacturing coated abrasives but has the disadvantage that it is brittle. Mixtures of glue and various water-soluble gums of my invention have been found to be very valuable because the gums are naturally tough and thus compensate for and reduce the brittleness of glue. Mixtures with phenol-aldehyde condensation products which may contain an excess of phenol or aldehyde, have also been found to be especially well adapted for use as a binder for coated abrasives for use in some kinds of abrading, as for example in metal surfacing.

Some of these gums may also be mixed with other liquid adhesives which are not soluble in water by employing a polyvinyl synthetic gum as a colloidal dispersing agent which stabilizes suspensions of water-insoluble resins in water and promotes the formation of colloidal aqueous dispersions or emulsions.

My invention has many advantages over the adhesive formerly used in the manufacture of abrasive articles. It provides a method for making abrasives with binders of different properties and therefore makes it possible to produce such articles which are particularly efficient for specific purposes. For example, coated abrasives which are to be used for woodworking require a binder having different properties than where the article is to be used for working steel. Furthermore, the characteristic of the binder can be varied depending upon the grit size of the abrasive grains which are to be used. Where coarse grits are employed, the binder must be stronger and tougher because the force applied to the binder through the abrasive grains is greater in such cases than where finer grits are used, by reason of the greater leverage on coarse grits.

In addition, my improved binders have the advantage over glue and normally liquid phenolic resins that aqueous solutions or dispersions of the binders are stable and adapted to be kept in liquid condition without deterioration. As is known, glue solutions putrefy upon standing and the strength and adhesiveness of the glue are impaired by subjection to temperatures substantially above 60° F. Consequently, where glue is employed as an adhesive, as in the manufacture of coated abrasive products, fresh batches of glue must be made up daily and precautions must be taken in the handling of the glue, both in its liquid state and after it has been applied to the backing to be sure that it is not overheated. Liquid phenolic resins also deteriorate with age even at normal temperatures, becoming much thicker in viscosity and unsuitable for use. At temperatures above normal this thickening and solidification becomes much more rapid. My binders may be heated to comparatively high temperatures without affecting the properties of the binder and are therefore more readily solidified and dried than is glue.

As has been pointed out, the binders are obtainable in various degrees of toughness and flexibility, depending upon the degree of polymerization of the product and are further adapted to be modified by the inclusion of suitable modifying agents.

Furthermore, my new adhesives have been found to be well adapted for use in the preparation of setup wheels because the adhesives can be liquefied and sold in liquid condition either alone or admixed with the abrasive grain, since there is no danger of putrefaction. Where glue is used, the user must prepare the glue solutions and in many instances is neither equipped nor trained to utilize glue to the best advantage.

As indicated, my invention is further adapted to a number of modifications such as the inclusion of other liquid adhesives which are miscible with the synthetic gums or inert filling materials such as powdered flint, and in general to the modifications commonly used in the art, such as the incorporation of plasticizing or flexibilizing agents or other modifiers. The liquefied binders may be incorporated with the abrasive grains by the methods described or by other suitable methods. For example, certain of the liquefied binders have been found to be especially adapted for spraying and have been applied as sizing coats for coated abrasives by this method.

Other modifications of the invention may be employed and the invention may be embodied in other methods and forms than those specifically described, such as abrasive discs where the binder may be employed to attach the abrasive grains to a backing (which may include vulcanized fiber) or to attach a preformed article to a backing such as steel, a hardened plastic material, wood or the like. It is therefore to be understood that the scope of the invention is not to be determined by the specific illustrations herein given but by the appended claims.

I claim:

1. An abrasive article comprising abrasive grain and a binder therefor comprising an ethenoid resin having a sufficient proportion of organic acid groups to make the resin soluble in weak aqueous alkalies.

2. An abrasive article comprising abrasive grain and a binder therefor comprising a solid polymer of an acrylic acid.

3. An abrasive article comprising abrasive grain and a binder therefor comprising solid polymethacrylic acid.

4. An abrasive article comprising abrasive grain and a binder therefor comprising a heteropolymer of an olefinic acid and a compound containing the vinyl group.

5. An abrasive article comprising abrasive grain and a binder therefor comprising a heteropolymer of styrene and maleic anhydride.

6. An abrasive article comprising abrasive grain and a binder therefor comprising a heteropolymer of styrene, vinyl acetate and maleic anhydride.

7. An abrasive article comprising abrasive grain and a binder therefor comprising a heteropolymer of vinyl acetate and maleic anhydride.

8. An abrasive article comprising abrasive grains and a solidified binder comprising a partial polyvinyl ester of a polybasic acid, said ester containing uncombined organic acid groups.

9. An abrasive article comprising abrasive grains and a solidified binder comprising a partial polyvinyl ester of a polybasic acid, said ester containing uncombined carboxyl groups.

10. An abrasive article comprising abrasive grains and a solidified binder comprising a partial polyvinyl ester of a polybasic acid, said ester containing uncombined sulphonic groups.

11. An abrasive article comprising abrasive grains and a solidified binder comprising a partial polyvinyl ester of a dibasic acid, said ester containing uncombined carboxyl groups.

12. An abrasive article comprising abrasive grains and a solidified binder comprising a partial polyvinyl ester of tartaric acid, said ester containing uncombined carboxyl groups.

13. An abrasive article comprising abrasive grains and a solidified binder comprising a partial polyvinyl ester of oxalic acid, said ester containing uncombined carboxyl groups.

14. An abrasive article comprising abrasive grains and a solidified binder comprising a partial polyvinyl ester of citric acid, said ester containing uncombined carboxyl groups.

NORMAN P. ROBIE.